(12) United States Patent
Baker et al.

(10) Patent No.: US 7,983,201 B2
(45) Date of Patent: Jul. 19, 2011

(54) COORDINATED INVITATIONS TO A CONFERENCE CALL

(75) Inventors: Albert J Baker, Eatontown, NJ (US); Frederick Peter Block, Westminster, CO (US); Eileen P Rose, Manasquan, NJ (US); Scott Allan Schell, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 1080 days.

(21) Appl. No.: 11/382,321

(22) Filed: May 9, 2006

(65) Prior Publication Data

US 2007/0274492 A1 Nov. 29, 2007

(51) Int. Cl.
*H04L 12/18* (2006.01)
(52) U.S. Cl. .................... 370/261; 379/202.01
(58) Field of Classification Search .............. 370/202, 370/260, 338, 328, 352
See application file for complete search history.

(56) References Cited

U.S. PATENT DOCUMENTS

| | | | | |
|---|---|---|---|---|
| 6,493,324 B1* | 12/2002 | Truetken | ........... | 370/261 |
| 6,742,042 B1* | 5/2004 | Orton et al. | ........... | 709/230 |
| 6,917,612 B2 | 7/2005 | Foti et al. | | |
| 6,937,597 B1* | 8/2005 | Rosenberg et al. | ........... | 370/356 |
| 6,982,973 B2* | 1/2006 | Truetken | ........... | 370/352 |
| 7,002,912 B2* | 2/2006 | Wengrovitz | ........... | 370/230 |
| 7,020,098 B2* | 3/2006 | Ehrsam et al. | ........... | 370/260 |
| 7,151,753 B2* | 12/2006 | Chaney et al. | ........... | 370/261 |
| 7,154,864 B2* | 12/2006 | Costa-Requena et al. | ........... | 370/261 |
| 7,170,863 B1* | 1/2007 | Denman et al. | ........... | 370/260 |
| 7,184,415 B2* | 2/2007 | Chaney et al. | ........... | 370/260 |
| 7,266,594 B2* | 9/2007 | Kumbalimutt et al. | ........... | 709/221 |
| 7,269,655 B2* | 9/2007 | Kim | ........... | 709/228 |
| 7,283,506 B2* | 10/2007 | Mayer et al. | ........... | 370/338 |
| 7,302,053 B2* | 11/2007 | Chang et al. | ........... | 379/220.01 |
| 7,340,046 B2* | 3/2008 | McClung et al. | ........... | 379/202.01 |
| 7,398,294 B2* | 7/2008 | Florkey et al. | ........... | 709/204 |
| 7,418,509 B2* | 8/2008 | Koskelainen et al. | ........... | 709/229 |
| 7,466,812 B1* | 12/2008 | Mahy et al. | ........... | 379/202.01 |
| 7,508,822 B2* | 3/2009 | Tanigawa et al. | ........... | 370/352 |
| 7,546,133 B2* | 6/2009 | Harris et al. | ........... | 455/518 |
| 7,617,280 B1* | 11/2009 | Webster et al. | ........... | 709/204 |
| 7,630,328 B2* | 12/2009 | Wright et al. | ........... | 370/260 |
| 7,653,192 B1* | 1/2010 | Sylvain | ........... | 379/202.01 |

(Continued)

OTHER PUBLICATIONS

Lee, Chi Ho A, "U.S. Appl. No. 11/382,319 Office Action Jan. 14, 2010", , Publisher: USPTO, Published in: US.

(Continued)

*Primary Examiner* — Ricky Ngo
*Assistant Examiner* — Ben H Liu
(74) *Attorney, Agent, or Firm* — DeMont & Breyer, LLC (57) ABSTRACT

A technique is disclosed that enables one or more telecommunications endpoints to subscribe to a conferencing system and to be notified of one or more conferencing events. As part of the conferencing system of the illustrative embodiment, a conference invitation server maintains information on all of the conferences that are scheduled to occur on the conferencing system, including (i) the addresses of the identified participants for each call and (ii) the conference identifier that the server generates for each call. When a conference call is going to begin, the server sends out notifications to all endpoints that are subscribed to the conference. If there are participants who are not subscribed to the conference, then alternative mechanisms for notifying participants can be used. Each subscribed endpoint then transmits a request to join the conference—either via user interaction or automatically—providing the conference identifier as part of the join request.

13 Claims, 6 Drawing Sheets

U.S. PATENT DOCUMENTS

| | | | |
|---|---|---|---|
| 7,656,824 B2 * | 2/2010 | Wang et al. | 370/262 |
| 2002/0120760 A1 | 8/2002 | Kimchi et al. | |
| 2003/0046433 A1 | 3/2003 | Luzzatti et al. | |
| 2004/0030750 A1 * | 2/2004 | Moore et al. | 709/204 |
| 2004/0125756 A1 * | 7/2004 | Lepore et al. | 370/261 |
| 2004/0133641 A1 * | 7/2004 | McKinnon et al. | 709/204 |
| 2005/0201320 A1 * | 9/2005 | Kiss et al. | 370/328 |
| 2005/0223104 A1 | 10/2005 | Pessi | |
| 2005/0262260 A1 | 11/2005 | Kim et al. | |
| 2006/0013233 A1 * | 1/2006 | Trossen et al. | 370/401 |
| 2006/0018292 A1 | 1/2006 | Wiatrowski et al. | |
| 2006/0039367 A1 | 2/2006 | Wright et al. | |
| 2006/0088152 A1 * | 4/2006 | Green et al. | 379/202.01 |
| 2006/0146792 A1 | 7/2006 | Ramachandran et al. | |
| 2006/0155814 A1 * | 7/2006 | Bennett et al. | 709/207 |
| 2006/0239255 A1 | 10/2006 | Ramachandran et al. | |
| 2007/0097886 A1 * | 5/2007 | Schwagmann et al. | 370/260 |
| 2007/0159989 A1 * | 7/2007 | Wu et al. | 370/260 |
| 2007/0239899 A1 | 10/2007 | Gonen et al. | |
| 2007/0263831 A1 | 11/2007 | Miao | |
| 2007/0291734 A1 | 12/2007 | Bhatia et al. | |
| 2008/0069315 A1 | 3/2008 | Tanigawa et al. | |
| 2008/0298278 A1 * | 12/2008 | Thakkar et al. | 370/260 |
| 2009/0295905 A1 | 12/2009 | Civanlar et al. | |

OTHER PUBLICATIONS

Lee, Chi Ho A, "U.S. Appl. No. 11/382,319 Notice of Allowance Jun. 17, 2010", Publisher: USPTO, Published in: US.

* cited by examiner

COORDINATED INVITATIONS TO A CONFERENCE CALL

CROSS-REFERENCE TO RELATED APPLICATIONS

This application incorporates herein by reference the underlying concepts, but not necessarily the nomenclature, of U.S. patent application Ser. No. 11/382,319, filed May 9, 2006.

FIELD OF THE INVENTION

The present invention relates to telecommunications in general, and, more particularly, to the coordination of a conference call setup.

BACKGROUND OF THE INVENTION

A telephone conference call is a means by which multiple participants communicate by calling into a conference "bridge," which is a system that enables all of the call's participants to hear each other. In the prior art, a conference call is arranged for by obtaining, from the conferencing service that provides the bridge, a telephone number and pass code with which to access the bridge. The bridge telephone number and pass code are distributed ahead of time to all of the participants of the call. At the time that the conference call is scheduled to begin, each participant dials into the bridge by using the telephone number and pass code.

When a person arranges a conference call, that person sends out the details for the conference call (i.e., date, time, bridge telephone number, and pass code) to the identified participants. The arranging person might also send a reminder or two (via email or other means) to the participants ahead of time, to increase the likelihood that most of the participants will call in on time. Alternatively, the arranging person might resort to using a group scheduling application like Outlook or Lotus, to both arrange for the call and to subsequently send the calling information to the participants automatically. These applications run on desktop personal computers and on a limited number of Windows-based mobile devices.

Organizing a conference in this way often costs time to at least some of the participants, as not everyone joins the call on time. For instance, some participants, such as highly-mobile users that use several devices throughout the day, often have difficulty remembering the dial-in information, if they can even remember that a conference call is about to take place. Furthermore, even if all of the participants have the dial-in information handy and are aware that a conference is about to take place, not everyone uses the same time source; consequently, some participants might dial in early, while some might dial in late.

What is needed is a way to improve the coordinating of a conference call, without some of the disadvantages in the prior art.

SUMMARY OF THE INVENTION

The present invention is a technique that enables one or more telecommunications endpoints to subscribe to a conferencing system and to be notified of one or more conferencing events. As part of the conferencing system of the illustrative embodiment, a conference invitation server maintains information on some or all of the conferences that are scheduled to occur on the conferencing system, including (i) the addresses of the identified participants for each call and (ii) the conference identifier that the server generates for each call. When a conference call is going to begin, the server sends out notifications to all endpoints that are subscribed to the conference. If there are participants who are not subscribed to the conference, then alternative mechanisms for notifying participants can be used. Each subscribed endpoint then transmits a request to join the conference—either via user interaction or automatically—providing the conference identifier as part of the join request.

In accordance with the illustrative embodiment of the present invention, the telecommunications endpoints exchange information with the conference invitation server by using the Session Initiation Protocol, or "SIP." SIP is a set of standardized communication rules for initiating and maintaining communications for telephony, presence-based systems, instant messaging, and other telecommunications applications.

The use of SIP as part of the illustrative embodiment is advantageous over some techniques in the prior art for various reasons. First, when requesting to be notified of one or more conference calls, all subscribing endpoints within an organization can send all requests to the same global uniform resource identifier (URI) for that organization; SIP is able to then determine how to route each request to the specific server that is assigned to a particular user. Using the same global URI, such as "www.company.com/cnf_srv_001.htm," in all endpoints makes special provisioning of specific addresses in each endpoint unnecessary. Second, when the endpoint receives a notification that a particular conference call is going to take place, it receives a conference identifier that the conference invitation server dynamically generated specifically for that conference call. The endpoint, which has already been authenticated in the network via a SIP-based service, uses the conference identifier in the request to join the conference, obviating the need to use a bridge telephone number and pass code. Third, SIP provides a way to communicate with a group of endpoint devices based on a public address that is resolvable to a set of registered endpoints for each participant. This means that the conference invitation server need only be provided with the public addresses of the participants, rather than with all of the specific phone numbers of those participants. When it is time to communicate the conferencing information to those participants, the server transmits the notifications to the public addresses, and a proxy server routes the notifications to the registered endpoints.

There are additional advantages of the illustrative embodiment over some techniques in the prior art. In some prior art techniques, the problem with using a method of disseminating schedule information about a conference call through scheduling applications such as Outlook or Lotus is that the scheduling application is separate from and not linked to the conferencing system. In the technique of the illustrative embodiment, the schedules of the various events (including conference calls) and the conferencing functionality are supported within the same conferencing system and are linked together. In addition, the scheduling, notification, and setup of each conference call are all performed by using standardized SIP messaging. The bottom line is that the tasks of remembering conferencing details and knowing when to call in to a conference are removed from the participants, and are performed instead by the conferencing system of the illustrative embodiment.

The illustrative embodiment of the present invention comprises transmitting, from a telecommunications endpoint, a first request to be notified of at least one event in a first set of events, wherein the at least one event comprises a first telecommunications session, and wherein the first request is transmitted in accordance with the Session Initiation Protocol; receiving a first notification of the at least one event, wherein the first notification comprises information about the first telecommunications session; and displaying at least a portion of the information.

DETAILED DESCRIPTION

The following terms are defined for use in this Specification, including the appended claims:

The term "call," and its inflected forms, is defined as a communication of user information between two or more telecommunications terminals. Examples of a call are a voice telephone call (including interactive voice response [IVR] sessions), an emailing, a text-based instant message [IM] session, a video conference, and so forth. In a Session Initiation Protocol (or "SIP") context, a call is a type of "session."

Figure 1:
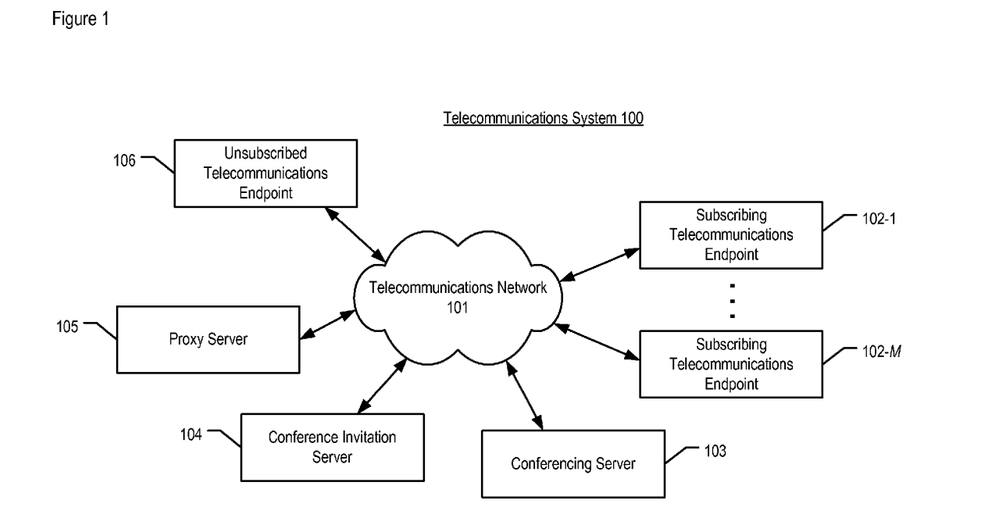
FIG. 1 depicts telecommunications system 100 in accordance with the illustrative embodiment of the present invention.

FIG. 1 depicts telecommunications system 100 in accordance with the illustrative embodiment of the present invention. Telecommunications system 100 comprises telecommunications network 101; subscribing telecommunications endpoints 102-1 through 102-M, wherein M is a positive integer; conferencing server 103; conference invitation server 104; proxy server 105; and unsubscribed telecommunications endpoint 106, interconnected as shown. Telecommunications system 100 is capable of Session Initiation Protocol-based (SIP-based) signaling, in accordance with the illustrative embodiment. Nevertheless, it will be clear to those who are skilled in the art, after reading this specification, how to apply the present invention to some alternative embodiments that use other types of call-control signaling, such as H.323 as is known in the art.

Telecommunications network 101 is a telecommunications network such as the Internet, the Public Switched Telephone Network (PSTN), and so forth. Network 101 comprises or is connected to one or more transmission-related nodes such as gateways, routers, or switches that are used to direct data packets from one or more sources to the correct destinations of those packets. Network 101 is capable of handling SIP-based messages in well-known fashion that are transmitted among two or more SIP-capable processing systems.

Subscribing telecommunications endpoint 102-*m*, for m=1 through M, is a SIP-capable device such as an Internet-protocol telephone, a notebook computer, a personal digital assistant (PDA), a tablet computer, and so forth. Endpoint 102-*m* is described in additional detail below and with respect to FIG. 2. Each endpoint is capable of originating outgoing calls and receiving incoming calls, in well-known fashion. In addition, each endpoint is capable of one or more communication modes that comprise, but are not limited to voice, video, data, email, instant messaging, and chat. Subscribing telecommunications endpoint 102-*m* is also capable of performing the tasks for requesting to be notified of one or more events; those tasks are described below and with respect to FIGS. 4 and 5.

Each subscribing telecommunications endpoint 102-*m* is identified by a unique contact address, as is known in the art. Moreover, each contact address is associated with a public address of a particular user. For example, a user named Bob Smith might have a public address of "bobsmith" and one endpoint, endpoint 102-1, which is identified by the contact address sip:19735554567@company.com. Similarly, a user named Carol Q. Jones might have a public address of "cjones" and four endpoints, endpoints 102-2 through 102-5, which are identified by the following contact addresses:

i. sip:cjones@111.111.111.111:5061;transport=tls;
   ii. sip:cqj@111.111.111.222:5061;transport=tls;
   iii. sip:19735551212@company.com; and
   iv. sip:carol@home.com.

A user named Alice Z. Martin might have a public address of "azmartin" and one endpoint, endpoint 102-6, which is identified by its own unique contact address as well. As those who are skilled in the art will appreciate, public addresses can be specified in various formats, as long as they are recognizable throughout network 101.

In the example, each telecommunications endpoint is considered to be a contact for the purpose of reaching its user (i.e., Bob, Carol, or Alice). When an endpoint is added to system 100, such as when the endpoint is plugged into a wall socket, the added endpoint registers its contact address with a registrar server. As a result, system 100 is able to resolve the called party's public address-specified by the calling party and received as part of an incoming call-into its constituent contact addresses and is then able to route the call to one or more registered telecommunications endpoints in well-known fashion.

It will be clear to those skilled in the art, after reading this specification, how to make and use subscribing telecommunications endpoint 102-*m*.

Conferencing server 103 is a data-processing system that fulfills conferencing service requests from its users. Server 103 enables, in well-known fashion, dial-in and dial-out conferencing that involves two or more of subscribing telecommunications endpoints 102-1 through 102-M and unsubscribed telecommunications endpoints, such as endpoint 106. Server 103 comprises a bridging function that mixes media, for each participant, from other sources on a conference call. Server 103 also comprises conference applications, in well-known fashion. In the illustrative embodiment, server 103 operates in accordance with the Session Initiation Protocol. In some alternative embodiments, as those who are skilled in the art will appreciate, server 103 can operate in accordance with a different set of protocols.

Conferencing server 103 receives and resolves one or more addresses that the server is presented with. Server 103 might also unhash one or more encoded addresses, in accordance with what is described in U.S. patent application Ser. No. 11/382,319, which has been incorporated by reference. In some embodiments, the physical addressing (i.e., contact addressing) of the conference participants is administered external to conferencing server 103, such as at proxy server 105. In any event, it will be clear to those who are skilled in the art how to make and use conferencing server 103.

Conference invitation server 104 is a server that operates in accordance with the Session Initiation Protocol and that is described in additional detail below and with respect to FIG. 3. Server 104 receives requests from subscribing telecommunications endpoints 102-1 through 102-M to be notified of one or more events. Server 104 also notifies the subscribing endpoints of those events, either ahead of time or as each event begins. The tasks that are related to receiving requests from endpoints to be notified and notifying those endpoints are described in detail below and with respect to FIGS. 4 and 6. Although conference invitation server 104 is depicted as being physically distinct from conferencing server 103, in some alternative embodiments the functionality of server 104 can be incorporated into server 103. It will be clear to those who are skilled in the art, after reading this specification, how to make and use conference invitation server 104.

Proxy server 105 is a server that operates in accordance with the Session Initiation Protocol. Server 105 is capable of handling incoming calls (i.e., invitations to join a session) on behalf of each of the users in telecommunications system 100 to whom public addresses are assigned. Based on the address that it receives, proxy server 105 routes the notification of an incoming call to one or more contacts, in well-known fashion. Although one proxy server (i.e., server 105) is depicted as part of system 100, system 100 comprises multiple proxy servers in some alternative embodiments. It will be clear to those skilled in the art how to make and use proxy server 105.

Unsubscribed telecommunications endpoint 106 is a SIP-capable device such as an Internet-protocol telephone, a notebook computer, a personal digital assistant (PDA), a tablet computer, and so forth. The similarity between unsubscribed telecommunications endpoint 106 and subscribing telecommunications endpoint 102-*m* is that both types of endpoints are capable of originating outgoing calls and receiving incoming calls, in well-known fashion. In addition, both types of endpoints are capable of one or more communication modes that comprise, but are not limited to voice, video, data, email, instant messaging, and chat. The difference between endpoint 106 and endpoint 102-*m* is that endpoint 106 is either (i) not currently subscribed to an event notification service or (ii) incapable of subscribing to an event notification service.

Figure 2:
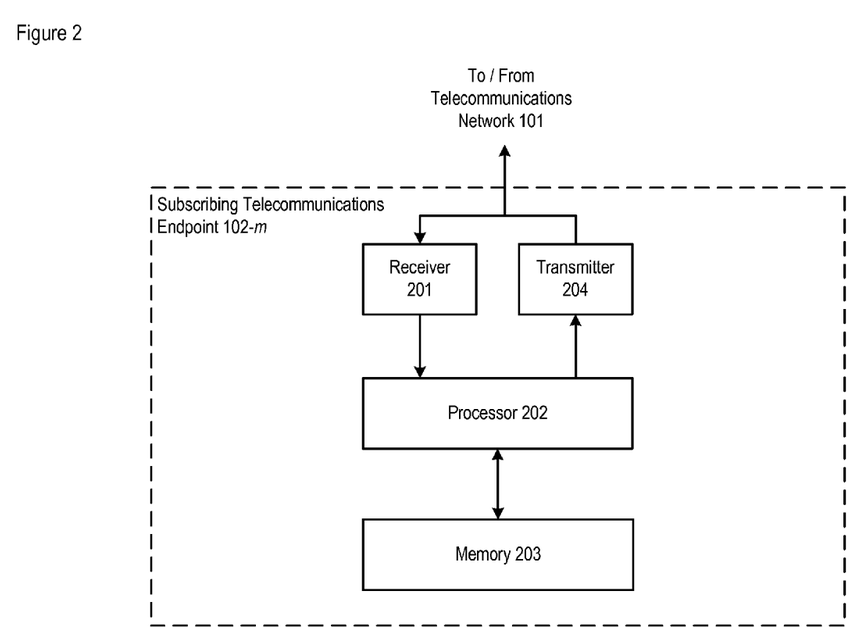
FIG. 2 depicts the salient components of subscribing telecommunications endpoint 102-*m*, which is part of system 100.

FIG. 2 depicts the salient components of subscribing telecommunications endpoint 102-*m*, in accordance with the illustrative embodiment of the present invention. Endpoint 102-*m* comprises receiver 201, processor 202, memory 203, and transmitter 204, interconnected as shown.

Receiver 201 receives signals from other nodes (e.g., conferencing server 103, conference invitation server 104, etc.) via network 101 and forwards the information encoded in the signals to processor 202, in well-known fashion. It will be clear to those skilled in the art, after reading this specification, how to make and use receiver 201.

Processor 202 is a general-purpose processor that is capable of receiving information from receiver 201, executing instructions stored in memory 203, reading data from and writing data into memory 203, executing the tasks described below and with respect to FIGS. 4 and 5, and transmitting information to transmitter 204. In some alternative embodiments of the present invention, processor 202 might be a special-purpose processor. In either case, it will be clear to those skilled in the art, after reading this specification, how to make and use processor 202.

Memory 203 stores the instructions and data used by processor 202. Memory 203 might be any combination of dynamic random-access memory (RAM), flash memory, disk drive memory, and so forth. It will be clear to those skilled in the art, after reading this specification, how to make and use memory 203.

Transmitter 204 receives information from processor 202 and transmits signals that encode this information to other nodes (e.g., conferencing server 103, conference invitation server 104, etc.) via network 101, in well-known fashion. It will be clear to those skilled in the art, after reading this specification, how to make and use transmitter 204.

Figure 3:
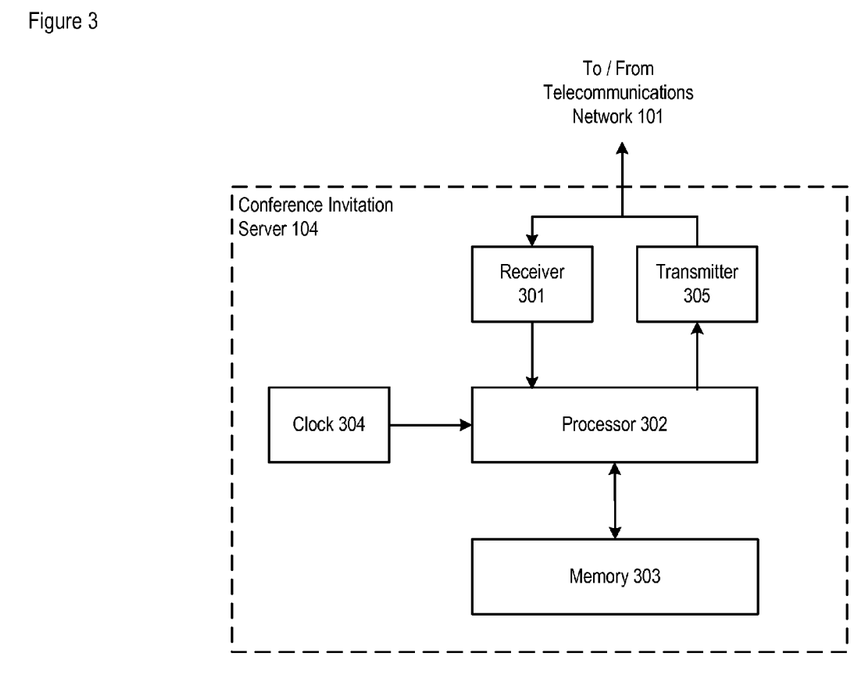
FIG. 3 depicts the salient components of conference invitation server 104, which is part of system 100.

FIG. 3 depicts the salient components of conference invitation server 104 in accordance with the illustrative embodiment of the present invention. Server 104 comprises receiver 301, processor 302, memory 303, clock 304, and transmitter 305, interconnected as shown.

Receiver 301 receives signals from other nodes (e.g., endpoint 102-*m*, conferencing sever 103, etc.) via network 101 and forwards the information encoded in the signals to processor 302, in well-known fashion. It will be clear to those skilled in the art, after reading this specification, how to make and use receiver 301.

Processor 302 is a general-purpose processor that is capable of receiving information from receiver 301, executing instructions stored in memory 303, reading data from and writing data into memory 303, receiving the time and date from clock 304, executing the tasks described below and with respect to FIGS. 4 and 6, and transmitting information to transmitter 305. In some alternative embodiments of the present invention, processor 302 might be a special-purpose processor. In either case, it will be clear to those skilled in the art, after reading this specification, how to make and use processor 302.

Memory 303 stores the instructions and data used by processor 302. Memory 303 might be any combination of dynamic random-access memory (RAM), flash memory, disk drive memory, and so forth. It will be clear to those skilled in the art, after reading this specification, how to make and use memory 303.

Clock 304 maintains the current date and time in well-known fashion, and provides the date and time to processor 302, either autonomously or when requested to do so. It will be clear to those skilled in the art, after reading this specification, how to make and use clock 304.

Transmitter 305 receives information from processor 302 and transmits signals that encode this information to other nodes (e.g., endpoint 102-*m*, endpoint 106, conferencing sever 103, etc.) via network 101, in well-known fashion. It will be clear to those skilled in the art, after reading this specification, how to make and use transmitter 305.

Figure 4:
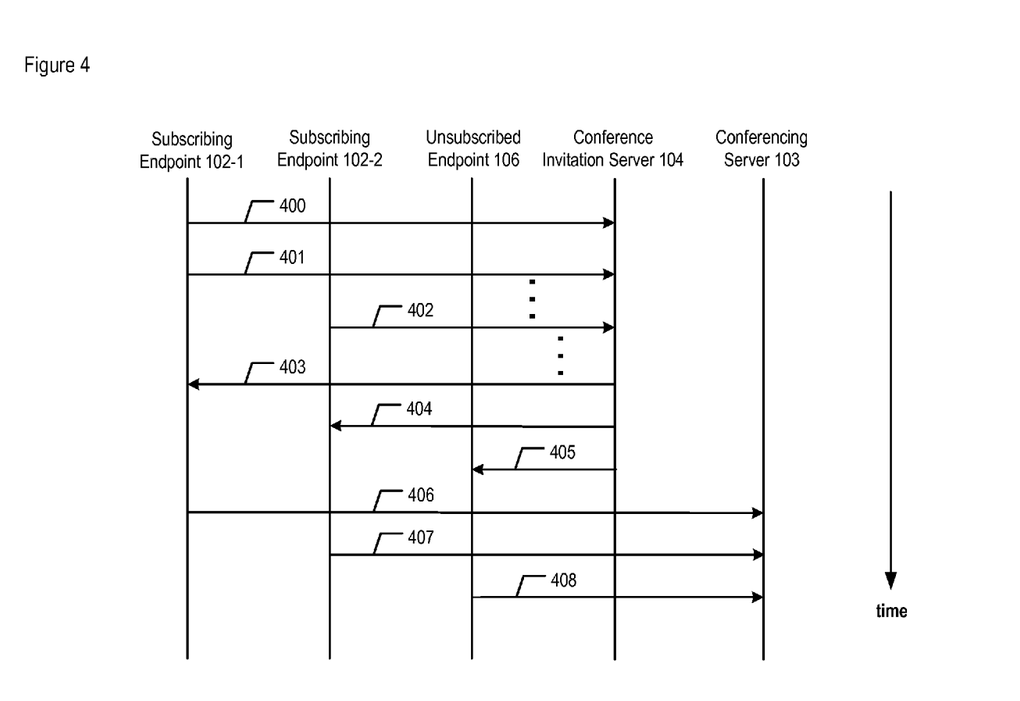
FIG. 4 depicts a message flow diagram of the salient events handled within telecommunications system 100 in exchanging information about a conference call, in accordance with the illustrative embodiment of the present invention.

FIG. 4 depicts a message flow diagram of the salient events handled within telecommunications system 100 in exchanging information about a conference call, in accordance with the illustrative embodiment of the present invention. In the depicted example, Bob, Carol, and Alice (referred to in an earlier example) are to be participants of the conference call, with Bob arranging the call. As those who are skilled in the art will appreciate, some of the events that appear in FIG. 4 can occur in parallel or in a different order than that depicted. Furthermore, some of the events that appear in FIG. 4 can involve other nodes (e.g., additional proxy servers, etc.), in some alternative embodiments, as those who are skilled in the art will appreciate.

Bob, who is the user of endpoint 102-1, wishes to set up a conference call with Carol and Alice. Carol is the user of endpoints 102-2 through 102-4, and Alice is the user of endpoint 106. Note that Alice's endpoint, endpoint 106, is incapable of requesting notification of the conference call. Bob initially arranges the conference call by selecting the participants (e.g., from a "buddy list," etc.), specifying other details for the call (e.g., time and date, etc.), and pressing the appropriate button on his endpoint. In some alternative embodiments, endpoint 102-1 creates an encoded initial address that is representative of the conference information that Bob specified. Bob's endpoint transmits the conference scheduling information via message 400.

In addition, Bob's endpoint then transmits his request to be notified of the conference call, via message 401, to the conferencing service that he uses, where the request is handled by conference invitation server 104. In some embodiments, the request is first routed to conferencing server 103, which then forwards the request—or some of the data conveyed by the request—to server 104. As those who are skilled in the art will appreciate, message 401 can be a SIP SUBSCRIBE message. In some alternative embodiments, the information conveyed in messages 400 and 401 can be transmitted using a single message.

Independent of Bob's request, Carol wants to request notification of one or more events. Carol makes the request by specifying the details of the events that she wants to be notified about and pressing the appropriate button on one of her subscribe-capable, telecommunications endpoints-in this case, endpoint 102-2. Carol's endpoint then transmits her request, in message 402, to the conferencing service that Carol and Bob use, where the request is handled by conference invitation server 104. In some embodiments, the request is first routed to conferencing server 103, which then forwards the request—or some of the data conveyed by the request—to server 104. As those who are skilled in the art will appreciate, message 402 can be a SIP SUBSCRIBE message.

At some time after the subscribe requests have been made, conference invitation server 104 transmits notification of the conference call that Bob arranged to Bob's and Carol's public addresses via messages 403 and 404, respectively. As those who are skilled in the art will appreciate, messages 403 and 404 can be SIP NOTIFY messages. In accordance with the illustrative embodiment, system 100 determines the contacts that should actually receive the addresses. For example, proxy server 105 determines that the notification should be routed to endpoint 102-1 for Bob and to endpoints 102-2 and 102-4, which are Carol's currently registered endpoints.

Conference invitation server 104 also is aware that Alice is also a participant of the conference call, based on Bob's original input; however, Alice's endpoint (i.e., endpoint 106) is incapable of subscribing to event notification. Consequently, system 100 sends an alternative form of notification, via message 405, to endpoint 106. The alternative form of notification can be an instant message (IM), an email, a short-message service message, and so forth. The notification can be based on the user's configured rules; for example, Alice's rule might be to try instant messaging first, then paging, then email. In some alternative embodiments, server 104 can defer to proxy server 105 to determine the best way to contact the user.

When Bob's and Carol's endpoints receive the notification of the conference call, either the endpoints can notify their users (e.g., by displaying the details of the conference call, etc.), prompting the users to join the conference call, or the endpoints can automatically join the conference call. Endpoints 102-1 and 102-2 transmit to server 103 a request to join the conference call, via messages 406 and 407, respectively. Messages 406 and 407 can be SIP INVITE messages, as those who are skilled in the art will appreciate. Each of messages 406 and 407 specifies the uniform resource identifier (URI) that is specific to the conference call, which was provided to the endpoints in messages 403 and 404. System 100 then joins the endpoints to the conference call session in well-known fashion.

Alice, having been notified of the conference call through an alternative mechanism, also is able to join the call by specifying the received conferencing information to endpoint 106; the endpoint then transmits the request to join the call, via message 408. As those who are skilled in the art will appreciate, message 408 can be a SIP INVITE messages or a non-SIP message that is routed to server 103 via a SIP gateway. Message 408 specifies the URI that is specific to the conference call, which was provided to endpoint 106 earlier and then selected or entered by Alice. System 100 then joins endpoint 106 to the conference call session in well-known fashion.

Note that the example provided applies to the setting up of conference calls a longer time in the future—such as in hours, days, weeks, and so forth—as well as a shorter time in the future—such as momentarily. For example, if Bob wants to conference with Carol and Alice immediately, he specifies the conferencing information, including details that the conference is to start immediately and the public (or endpoint) addresses of Carol and Alice, and transmits the information to server 104. Server 104 then sends the conference details, including the provisioned URI of the conference call, to the specified addresses; system 100 routes the sent details to one or more of Carol's and Alice's endpoints. Carol, Alice, and Bob then join the conference call by specifying the conference call's URI in their join requests.

As depicted in FIG. 4, conference invitation server 104 notifies one or more subscribing telecommunications endpoints about an event (e.g., a conference call session, etc.), and it is then up to each endpoint to transmit back a request to join a session. In some alternative embodiments, however, server 104 notifies one or more endpoints about the event, followed by server 104 transmitting (e.g., via a SIP INVITE, etc.) requests to the endpoints to join the session, instead of the endpoints transmitting the requests to server 104. And in some other alternative embodiments, server 104 transmits the requests to the endpoints to join the session, without first notifying the endpoints about the event.

Figure 5:
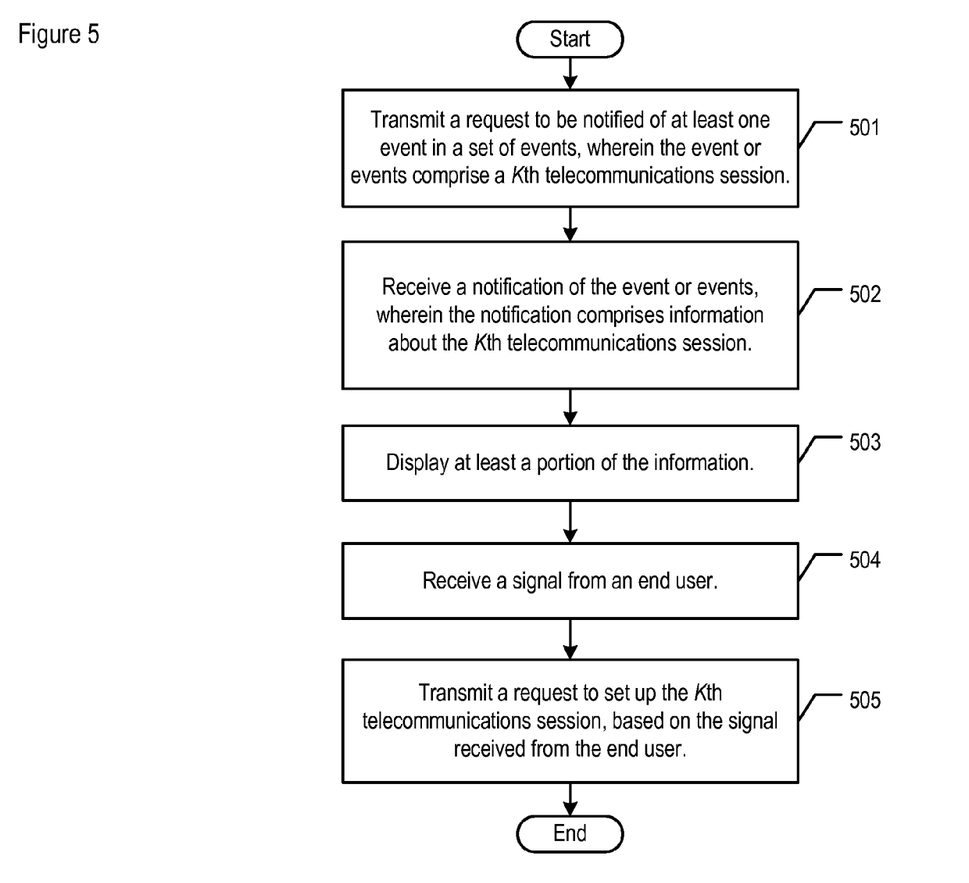
FIG. 5 depicts a flowchart of the salient tasks performed by subscribing telecommunications endpoint 102-*m* in requesting and receiving notification about one or more events, in accordance with the illustrative embodiment of the present invention.

FIG. 5 depicts a flowchart of the salient tasks performed by subscribing telecommunications endpoint 102-$m$ in requesting and receiving notification about one or more events, in accordance with the illustrative embodiment of the present invention. As those who are skilled in the art will appreciate, some of the tasks that appear in FIG. 5 can be performed in parallel, in a different order than that depicted, or in a data-processing system other than endpoint 102-$m$.

At task 501, endpoint 102-$m$ transmits a request, based on input from its user, to conference invitation server 104 to be notified of at least one event in a set of events. One such event might be a particular telecommunications session that is to take place, such as a conference call that involves the user of endpoint 102-$m$. In some embodiments, endpoint 102-$m$ subscribes to a global uniform resource identifier (e.g., "www.company.com/conf_invitn_srvr", etc.) for all notification requests, thereby obviating the need for any special provisioning or configuration to be done at the endpoint.

At task 502, endpoint 102-$m$ receives a notification of the telecommunications session to take place. The notification comprises information about the telecommunications session. For example, the notification can indicate the time and date of a conference call, the other parties involved, the uniform resource identifier of the call, and so forth.

At task 503, endpoint 102-m displays at least a portion of the received information. For example, the endpoint might display the time and date of the conference call, the other parties involved, and so forth. The endpoint might not need to display the uniform resource identifier of the call and might only store the identifier to use later in joining the session.

At task 504, endpoint 102-m receives a signal from its end user. For example, the user might indicate to join the call.

At task 505, endpoint 102-m transmits a request to set up the first telecommunications session. In some embodiments, the endpoint transmits the request when it receives a signal from the user to do so.

Subscribing telecommunications endpoint 102-m is able to concurrently handle multiple requests to be notified of different events. For example, the user of endpoint 102-m might either need to schedule multiple conference calls or to track multiple events that are related to different telecommunications sessions. Moreover, endpoint 102-m is able to handle multiple notifications of different sessions. For example, the user of endpoint 102-m might already be on a first conference call, where the endpoint was joined to the call in accordance with the illustrative embodiment, and is then notified of a second conference call that is about to start; in this case, the user can seamlessly transfer to the second call by directing endpoint 102-m to do so.

Figure 6:
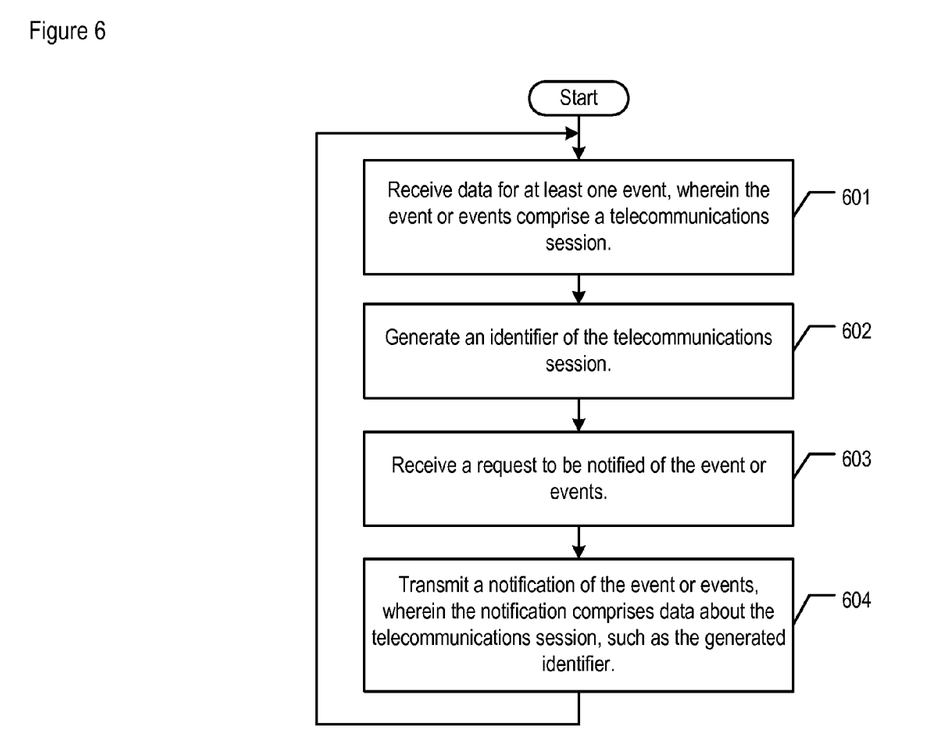
FIG. 6 depicts a flowchart of the salient tasks performed by conference invitation server 104 in processing a request to be notified of a telecommunications session, in accordance with the illustrative embodiment of the present invention.

FIG. 6 depicts a flowchart of the salient tasks performed by conference invitation server 104 in processing a request to be notified of a telecommunications session, in accordance with the illustrative embodiment of the present invention. As those who are skilled in the art will appreciate, some of the tasks that appear in FIG. 6 can be performed in parallel, in a different order than that depicted, or in a data-processing system other than server 104.

At task 601, server 104 receives schedule data for a telecommunications session, including information about a particular telecommunications session.

At task 602, server 104 generates a session identifier, such as a uniform resource identifier, which is intended to be used by one or more endpoints to point to the particular session, such as a conference call, when it begins.

At task 603, server 104 receives a request from endpoint 102-m to be notified of an event, in the set of events that server 104 is tracking.

At task 604, server 104 transmits a notification of the event to the endpoint or endpoints that requested notification previously (i.e., that are subscribed to the event). The notification comprises data about the telecommunications session, including the session identifier generated at task 602 and other information that is needed to join the session. In accordance with the illustrative embodiment, server 104 transmits the notification at a reminder interval (e.g., 15 minutes, etc.) prior to the session's scheduled start time. In some alternative embodiments, server 104 transmits the notification when the session is to begin. As those who are skilled in the art will appreciate, server 104 can transmit multiple notifications to each participant for the same event—for instance, 15 minutes before the event and also when the event is to begin.

If the server 104 had been provisioned with the public addresses of the participants, the notification can be addressed to the public addresses of the participants. Proxy server 105, in well-known fashion, can determine which endpoints to send the message to, based on the public addresses.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   transmitting, by a first telecommunications endpoint to a first server, a first request to establish a first telecommunications session, wherein the first request comprises:
   i) a first identifier of the first telecommunications endpoint, and
   ii) a second identifier of a second telecommunications endpoint,
   transmitting, by the first telecommunications endpoint to the first server, a second request to be notified of the first telecommunications session after transmitting the first request;
   receiving, by the first telecommunications endpoint from a second server, a first notification in response to transmitting the second request, wherein:
   i) the first telecommunications endpoint receives the first notification based on the fact that the first telecommunications endpoint is registered with the first server, and
   ii) the second telecommunications endpoint receives a second notification that is different from the first notification based on the fact that the second telecommunications endpoint is not registered with the first server; and
   transmitting, by the first telecommunications endpoint to the first server, a third request to connect to the first telecommunications session after receiving the first notification;
   wherein the second server transmits the second notification to the second telecommunications endpoint in response to the first server identifying that the second telecommunications endpoint is incapable of subscribing to the first server; and
   wherein the second server transmits the second notification to the second telecommunications endpoint based on a rule specified by a user of the second telecommunications endpoint.

2. The method of claim 1 wherein the first server transmits:
   i) the first notification to the first telecommunications endpoint based on the first identifier, and ii) the second notification to the second telecommunications endpoint based on the second identifier; and wherein the first identifier and the second identifier are public addresses stored at the first telecommunications endpoint.

3. The method of claim 1 wherein the second server transmits:

i) the first notification to the first telecommunications endpoint based on the first identifier, and ii) the second notification to the second telecommunications endpoint based on the second identifier; and wherein the first identifier and the second identifier are public addresses stored at the first telecommunications endpoint.

4. The method of claim 1 wherein the second server:

i) identifies a first unique identifier of the first telecommunications endpoint based on the first identifier, and ii) identifies a second unique identifier of the second telecommunications endpoint based on the second identifier.

5. The method of claim 4 wherein the second server transmits:

ii) the first notification to the first telecommunications endpoint based on the first unique identifier, and ii) the second notification to the second telecommunications endpoint based on the second unique identifier.

6. The method of claim 1 wherein the rule specifies how to sequentially transmit the second notification to the second telecommunications endpoint using different types of communications media.

7. The method of claim 1 wherein the first notification comprises a session identifier of the first telecommunications session;

wherein the third request transmitted by the first telecommunications endpoint to the first server comprises the session identifier of the first telecommunications session; and wherein the first server connects the first telecommunications endpoint to the first telecommunications session based on the session identifier.

8. The method of claim 1 wherein the second notification comprises a session identifier of the first telecommunications session;

wherein the second telecommunications endpoint transmits to the first server, a fourth request that comprises the session identifier;

wherein the fourth request is a non-Session Initiation Protocol message; and wherein the first server connects the second telecommunications endpoint to the first telecommunications session based on the session identifier.

9. The method of claim 1 wherein the second telecommunications endpoint is in a second telecommunications session, and wherein the second notification notifies a user of the second telecommunications endpoint that the first telecommunications session is to commence within a time interval T.

10. The method of claim 1 wherein the task of transmitting the third request further comprises receiving, by the first telecommunications endpoint, a signal from a user of the first telecommunications endpoint, wherein the signal indicates that the user desires to connect to the first telecommunications session.

11. The method of claim 1 wherein the task of receiving the first notification by the first telecommunications endpoint further comprises displaying, by the first telecommunications endpoint, a text message that comprises a session identifier of the first telecommunications session.

12. The method of claim 1 wherein the first request comprises a time interval T of when the first notification is to be transmitted relative to a scheduled start time of the first telecommunications session.

13. The method of claim 1 wherein the first telecommunications endpoint transmits the first request to the first server based on a global uniform resource identifier;

wherein the global uniform resource identifier is used by the first telecommunications endpoint for all notifications in a set of events that includes the first telecommunications endpoint; and wherein the first set of events comprises:

i) the first telecommunications session, and ii) a second telecommunications session.

* * * * *